UNITED STATES PATENT OFFICE.

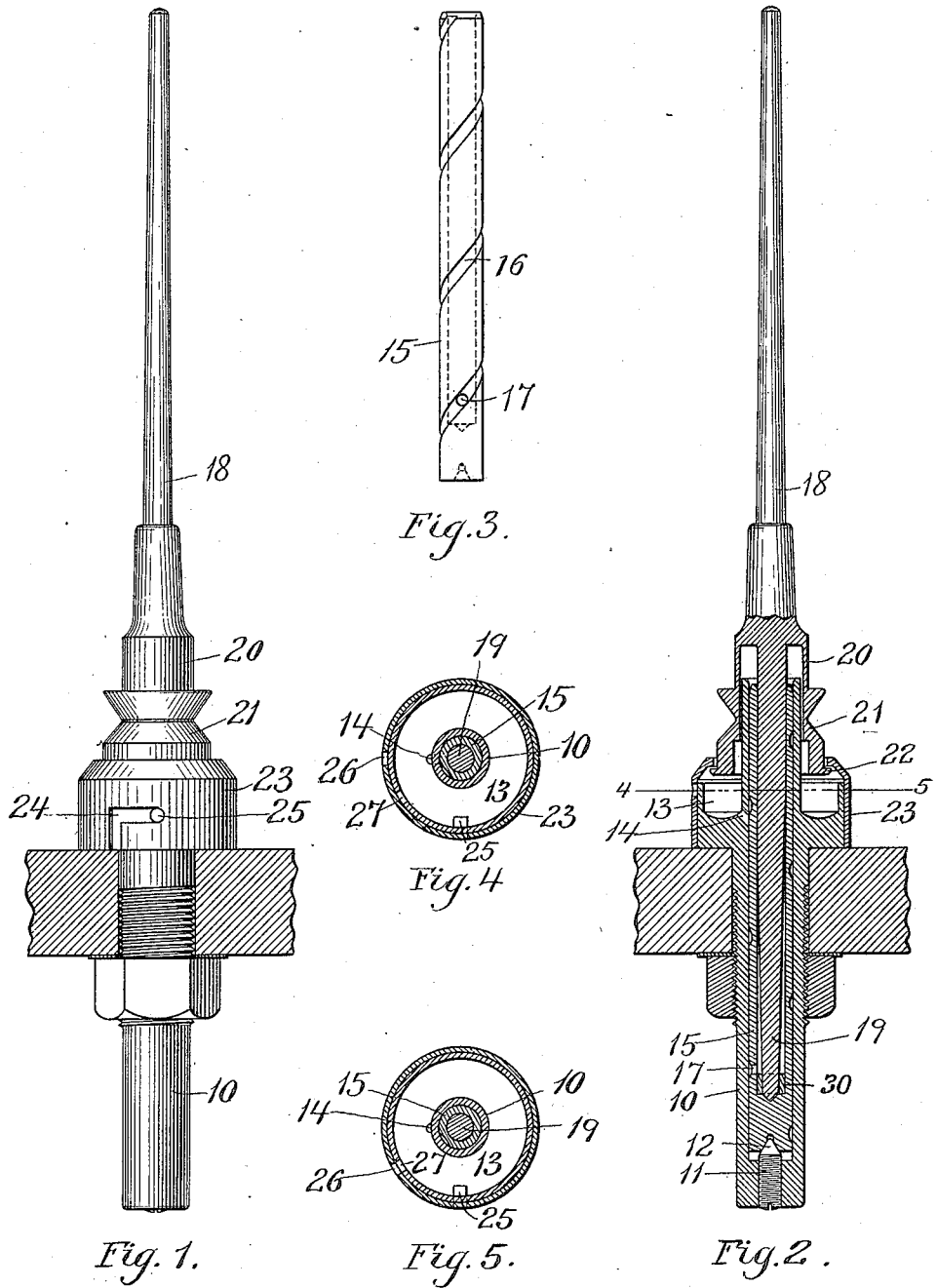

ALBERT LONG, OF LAWRENCE, MASSACHUSETTS, ASSIGNOR OF ONE-THIRD TO ISAAC S. LEADBETTER, OF SWAMPSCOTT, MASSACHUSETTS, AND ONE-THIRD TO RUFUS A. SHOREY, OF EAST ROCHESTER, NEW HAMPSHIRE.

SPINDLE FOR SPINNING-MACHINES.

No. 902,890.      Specification of Letters Patent.      Patented Nov. 3, 1908.

Application filed March 27, 1908. Serial No. 423,666.

*To all whom it may concern:*

Be it known that I, ALBERT LONG, of Lawrence, in the county of Essex and State of Massachusetts, have invented certain new and useful Improvements in Spindles for Spinning-Machines, of which the following is a specification.

This invention relates to spindles for yarn spinning and has particular reference to the bearings therefor.

One of the objects of the invention is to provide a construction of bearing which will practically absolutely prevent access of dust or dirt to the bearing surfaces.

Another object is to provide a bearing which will be as nearly absolutely frictionless as possible, the construction being such that the instant any friction does occur between the lower end of the spindle and the immediate surrounding surface, oil will be automatically fed to that surface, but without requiring a constant circulation of oil.

Still another object of the invention is to provide improved means for locking the spindle to its seat but which will permit of a very ready separating thereof.

To these ends the invention consists in the construction and combination of parts substantially as hereinafter described.

Of the accompanying drawings, Figure 1 is a side elevation of a spindle and its bearing embodying my invention. Fig. 2 represents a vertical section through the same. Fig. 3 is a detail elevation of the bushing removed. Figs. 4 and 5 are sectional views, each taken on the line 4—5 of Fig. 2 but indicating different relative positions of the cover and oil chamber or reservoir.

The same reference characters indicate the same or similar parts in all of the figures.

The bearing 10 is formed with a hole in its lower end, which hole is internally threaded to a fine pitch, a screw 11 having a cone bearing 12 being fitted to said threaded opening. The upper end of the bearing is enlarged and is cup shaped to form an oil chamber 13 which communicates by a small hole 14 with the interior of the bearing 10. Fitting somewhat snugly within the bearing 10 is a bushing 15 which may be of fiber or any suitable metal or composition. Said bushing is formed with an external spiral groove 16 and with a hole 17 connecting the lower portion of the spiral groove with the vertical recess inside of said bushing. Said bushing rests upon the cone bearing 12 of the screw 11 and at its upper end extends to or nearly to the upper end of the bearing 10.

The spindle 18 is formed with a tapered lower end 19 extending into the recess in the bushing 15, the extreme lower end of the spindle having a step bearing on the bottom of the bushing. The spindle is also provided with an annular hood 20, the lower portion of which is formed as a whirl 21. The extreme lower edge of the hood or whirl is formed with a slightly horizontal flange 22.

A cylindrical cover 23 is formed with an opening but slightly larger than the lower portion of the whirl 21 so as to fit over the flange 22. Said cover is formed with a bayonet slot 24 adapted to engage a pin or dowel 25 projecting from the wall of the oil chamber 13.

The cover 23 and the wall of the oil chamber 13 are, respectively, formed with holes 26 and 27 which are adapted to register with each other when the cover is turned to a position which brings the vertical portion of the bayonet slot 24 below the pin 25. When the cover is in this position, oil can be supplied by an oil can through the holes 26 and 27 to the oil chamber 13. But as soon as the cover is turned to the position indicated in Fig. 1, the holes 26 and 27 are out of register as shown in Fig. 4, thereby closing all entrance to the oil chamber which might admit dust or dirt. The opening in the top of the cover fits the whirl so closely in practice that it and the presence of the flange 22 below it will prevent access of dust or dirt through the top of the cover. Said cover, when turned to the position shown in Fig. 1, serves of course to lock the spindle so that it cannot be removed, this being due to the flange 22. In operation, oil being present in the chamber or reservoir 13, it leaks through the hole 14 down around the bushing and along the spiral groove thereof and through the hole 17 to the space around the lower end 19 of the spindle. If the contacting surfaces of the bushing and the lower portion of the spindle are sufficiently lubricated, the bushing will not turn; but as soon as any friction occurs between the spindle and its bushing sufficient to rotate the bushing, oil will be carried up along the spiral groove 16, the direction of the spiral being such that the rotation of the spindle in use, which is of course usually to the right, will cause the oil to be forced up the said spiral groove. The oil which is forced up to the top of the bushing escapes, some of it over the top down to the inside of the bushing and the surplus returns over the top of the upper sleeve portion of the bearing and inside of the hood 20 and the whirl back to the oil chamber or reservoir. There is therefore caused an occasional circulation of the oil whenever there is any such friction between the lower portion of the spindle and the surface which immediately supports it as would tend to cause that immediately supporting surface to rotate. In other words, the bushing is intermittently self-lubricating because whenever it is caused to run or rotate, it lifts oil to the top of the bearing.

A loose collar 30 preferably surrounds the lower end of the spindle 19 to center it and prevent lateral movement of said lower end or tendency to get away from its step bearing.

I claim:—

1. A spindle bearing having a bushing provided with a spiral groove, a spindle mounted in said bushing, an oil reservoir, and means whereby rotation of the bushing will cause oil to circulate.

2. The combination with a spindle bearing having an oil reservoir, of a bushing having an external spiral groove and mounted in said bearing, and a spindle mounted in said bushing, means being provided for permitting oil to pass from the reservoir to the inside of said bearing.

3. The combination with a spindle bearing having an oil reservoir, of a bushing having an external spiral groove and mounted in said bearing, said bushing having a hole near its lower end, and a spindle mounted in said bushing, a hole being formed to permit oil to pass from the oil reservoir to the outer surface of the bushing.

4. The combination with a spindle and a bearing therefor, of an interposed bushing having an external spiral groove, and means for supplying oil to said bushing.

5. A spindle bearing having a pin, a spindle mounted in said bearing and having a flange, and a cover having an opening of less diameter than said flange and having a bayonet slot to engage said pin.

6. A spindle bearing having an annular oil reservoir and provided with a pin, a cover for said reservoir having a bayonet slot engaging said pin, the cover and the wall of the reservoir being formed with holes adapted to register when the cover is turned to a predetermined position, and a spindle mounted in said bearing and having a whirl formed with a flange adapted to be engaged by said cover to retain the spindle in its seat, the said flange having a diameter greater than that of the opening in the cover through which the spindle extends.

7. A spindle bearing having an annular oil reservoir, a spindle mounted in said bearing, an interposed bushing having an external spiral groove, means being provided for permitting oil to circulate from the oil reservoir to the inside and outside of the bushing and back to the reservoir, and means for locking the spindle in position.

8. The combination with a spindle bearing having a screw at its lower end, of a bushing directly mounted on said screw and having an external spiral groove, a spindle support in the bushing, an oil reservoir, and means for permitting oil to flow from said reservoir to said bushing.

In testimony whereof I have affixed my signature, in presence of two witnesses.

ALBERT LONG.

Witnesses:
A. W. HARRISON,
P. W. PEZZETTI.